(12) United States Patent
Campbell et al.

(10) Patent No.: US 11,381,193 B2
(45) Date of Patent: Jul. 5, 2022

(54) EMBEDDED ELECTRONIC MOTOR DISCONNECT

(71) Applicant: Rockwell Automation Technologies, Inc., Mayfield Heights, OH (US)

(72) Inventors: Al J. Campbell, Mequon, WI (US); Timothy J. Strandt, Mequon, WI (US); Jason H. Downing, Mequon, WI (US); Divesh Sachdeva, Mequon, WI (US); Daniel J. Middlestetter, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 5 days.

(21) Appl. No.: 17/027,035

(22) Filed: Sep. 21, 2020

(65) Prior Publication Data

US 2022/0094296 A1    Mar. 24, 2022

(51) Int. Cl.
    *H02P 29/024*    (2016.01)
(52) U.S. Cl.
    CPC .................. *H02P 29/024* (2013.01)
(58) Field of Classification Search
    CPC .................................................. H02P 29/024
    USPC .................................................... 318/434, 34
    See application file for complete search history.

(56) References Cited

U.S. PATENT DOCUMENTS

| | | | |
|---|---|---|---|
| 5,272,386 A | 12/1993 | Kephart | |
| 6,087,800 A * | 7/2000 | Becker | H02P 1/16 318/370 |
| 7,057,311 B1 * | 6/2006 | Zhou | H01H 50/546 307/131 |
| 7,224,557 B2 * | 5/2007 | Kinsella | H01H 9/40 361/2 |
| 7,253,577 B2 | 8/2007 | Campbell et al. | |
| 8,046,179 B2 | 10/2011 | Campbell et al. | |
| 9,577,424 B2 | 2/2017 | Campbell | |
| 2006/0261749 A1 | 11/2006 | Campbell et al. | |
| 2010/0088047 A1 | 4/2010 | Campbell et al. | |
| 2015/0001270 A1 | 1/2015 | Merkel et al. | |
| 2015/0249420 A1 | 9/2015 | Vitrano et al. | |
| 2015/0249612 A1 | 9/2015 | Vitrano et al. | |

FOREIGN PATENT DOCUMENTS

DE    10 2018 124118 B3    2/2020

OTHER PUBLICATIONS

Extended European Search Report and European Search Opinion dated Feb. 16, 2022 Application No. EP21197977.8, 9 pages.

* cited by examiner

*Primary Examiner* — David Luo
(74) *Attorney, Agent, or Firm* — Fay Sharpe LLP (57) ABSTRACT

A disconnect override circuit for a power conversion system includes a first input coupled to a user disconnect switch to receive a disconnect input signal, as well as a second input coupled to a motor drive or motor starter to receive a fault signal, and a third input adapted to receive an override signal. The disconnect override circuit has an output configured to provide a disconnect control output signal to control a user disconnect circuit according to the disconnect input signal, the fault signal and the override signal, the output signal having a first state to cause the user disconnect circuit to allow power transfer from the AC input to the motor drive or motor starter, and a second state to cause the user disconnect circuit to prevent power transfer from the AC input to the motor drive or motor starter.

18 Claims, 8 Drawing Sheets

EMBEDDED ELECTRONIC MOTOR DISCONNECT

BACKGROUND INFORMATION

The subject matter disclosed herein relates to power conversion systems.

BRIEF DESCRIPTION

In accordance with one aspect, a power conversion system includes a motor drive or motor starter in an enclosure and an AC input adapted to be coupled to an AC power source, along with a user disconnect circuit, a user disconnect switch, and a disconnect override circuit in the enclosure. The user disconnect circuit is coupled between the AC input and the motor drive or motor starter in the enclosure and includes a control input configured to receive a user disconnect control input signal. The user disconnect circuit is configured to operate, according to the user disconnect control input signal, in a first mode that allows power transfer from the AC input to the motor drive or motor starter, and a second mode that prevents power transfer from the AC input to the motor drive or motor starter. The user disconnect switch includes a first contact having a first terminal coupled to a control power supply, and a second terminal, and a second contact having a first terminal coupled to the control power supply, and a second terminal. The user disconnect switch has a first state that closes the first and second contacts, and a second state that opens the first and second contacts. The disconnect override circuit includes a first input coupled to receive a disconnect input signal from the second terminal of the first contact, a second input coupled to receive a fault signal from the motor drive or motor starter, and a third input coupled to receive an override signal. The disconnect override circuit includes an output coupled to provide a disconnect control output signal to the control input of the user disconnect circuit having one of a first state to cause the user disconnect circuit to operate in the first mode and a second state to cause the user disconnect circuit to operate in the second mode according to the disconnect input signal, the fault signal and the override signal.

In accordance with another aspect, a disconnect override circuit includes a first input adapted to be coupled to receive a disconnect input signal from a user disconnect switch, a second input adapted to be coupled to receive a fault signal from a motor drive or motor starter, a third input adapted to be coupled to receive an override signal, and an output. The output is configured to provide a disconnect control output signal to control a user disconnect circuit according to the disconnect input signal, the fault signal and the override signal. The output signal has a first state to cause the user disconnect circuit to operate in a first mode that allows power transfer from the AC input to the motor drive or motor starter, and a second state to cause the user disconnect circuit to operate in a second mode that prevents power transfer from the AC input to the motor drive or motor starter.

In accordance with a further aspect, a method includes, in response to detecting actuation of a user disconnect switch of a power conversion system, opening a contact of a user disconnect circuit to prevent power transfer from an AC input to a motor drive or motor starter using a disconnect override circuit, and selectively delaying the opening of the contact of the user disconnect circuit in response to detecting an asserted fault signal generated by processor of the motor drive or motor starter in a first state using the disconnect override circuit.

DETAILED DESCRIPTION

Figure 1:
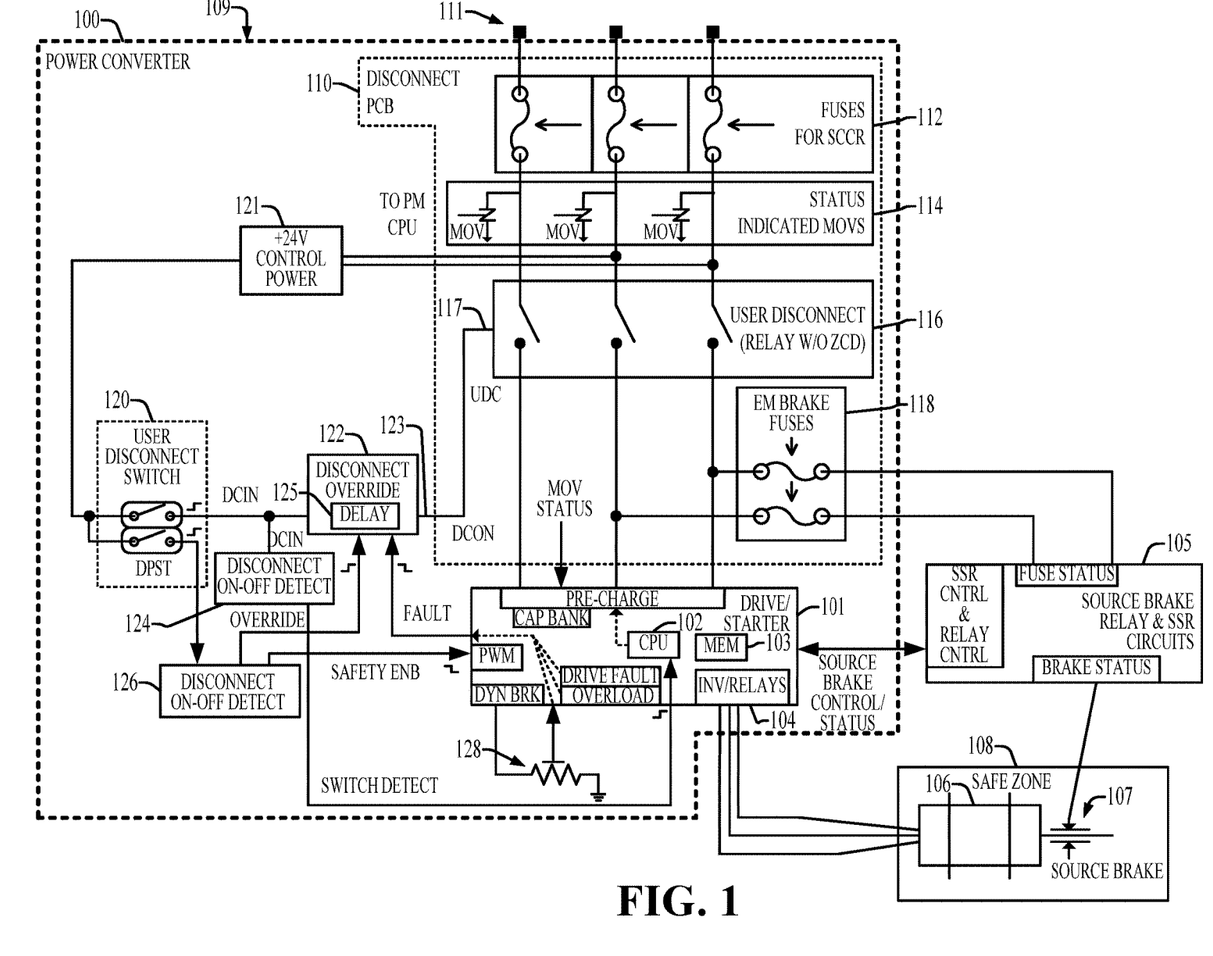
FIG. 1 is a schematic diagram of a power conversion system.

FIG. 1 shows a power conversion system or power converter 100 that includes a motor drive or motor starter 101. The motor drive or motor starter 101 includes a processor 102, and an electronic memory 103 with program instructions (e.g., software, firmware, etc.) executable by the processor 102 to perform various functions as detailed herein and others associated with operating a motor load and various user disconnection and fault detection features. The processor 102 executes program instructions and interacts with hardware components to implement intelligent and safe user disconnect features in the system 100. In one example, the motor drive or motor starter 101 includes an inverter or relay circuit 104 that is coupled to a motor load. A source brake circuit or system 105 is operatively coupled with the power conversion system 100 and with the processor 102, and includes a fuse status component to identify fuse faults associated with a source brake power feed (e.g., 480 VAC, single phase), along with a solid state relay (SSR) control and relay control circuit, and a brake status component. The circuit 105 provides source brake status information to the processor 102. A motor load 106 is coupled to the inverter or relay circuitry 104 of the system 100, and a source brake 107 is coupled to a rotor of the motor 106. The motor load 106 and source brake 107 are positioned in a safe zone 108.

The power conversion system 100 includes an enclosure 109, such as a cabinet or other structure having an interior for electronic components, subsystems and circuits carrying high voltages to protect users while the system 100 is powered. In the illustrated example, the system 100 includes power disconnection or interruption circuitry on a disconnect printed circuit board (PCB) 110 to interface the motor drive or motor starter 101 with AC input power via an AC input 111. The AC input 111 is adapted to be coupled to a single or multiphase AC power source (not shown), such as a three phase 480 VAC supply. The AC input 111 is coupled to a fuse circuit 112, in this case including three fuses for short circuit current rating (SCCR) protection of downstream components against excessive current flow (e.g., 75A rating).

The example PCB 110 also includes a varistor circuit 114 having three status indicated metal oxide varistors (MOVs) to protect against overvoltage conditions in the individual phases. The varistor circuit 114 provides MOV status information to the processor 102 (e.g., MOV STATUS signal in FIG. 1), for example, when an MOV is faulted. The varistor circuit 114 in one example is coupled to the fuse circuit 112 and provides overvoltage protection for downstream components in the system 100.

The system 100 also includes a three-phase user disconnect circuit 116 coupled to the varistor circuit 112 between the AC input 111 and the motor drive or motor starter 101 in the enclosure 109. The user disconnect circuit in various examples includes three switches or contacts individually coupled between respective phases of the AC input 111 and the motor drive or motor starter 101. Suitable examples include relay contacts (e.g., FIGS. 3 and 5 below), triacs (e.g., FIG. 6 below), silicon controlled rectifiers (SCRs, e.g., FIG. 7 below), and solid state field effect transistors (FETs) or other solid state relay (SSR) circuits (e.g., FIG. 8 below). The user disconnect circuit 116 has a control input 117 that is coupled to directly or indirectly receive a user disconnect control input signal UDC.

Figure 3:
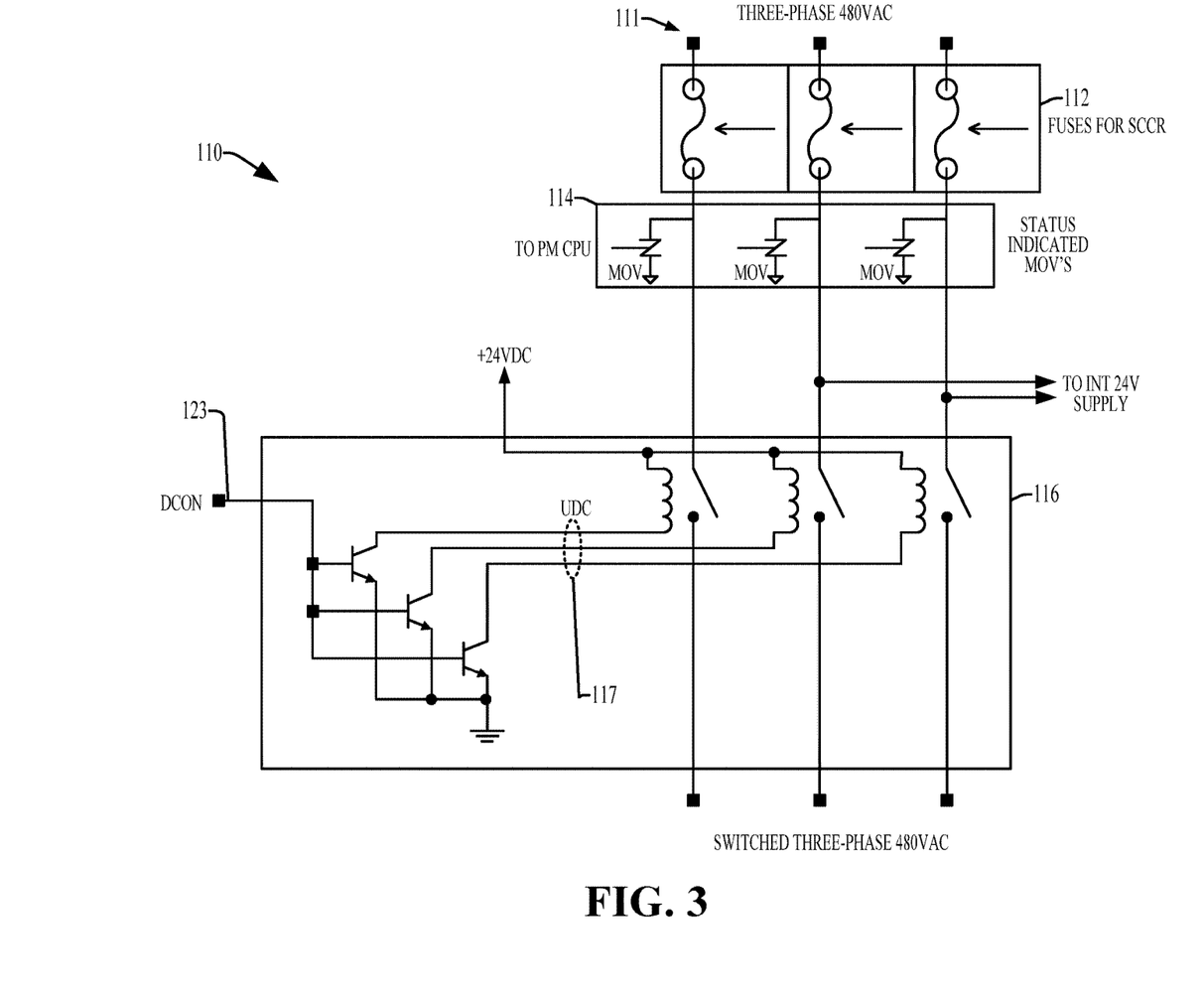
FIG. 3 is a schematic diagram of an example relay implementation of a user disconnect circuit in the power conversion system of FIG. 1.
Figure 4:
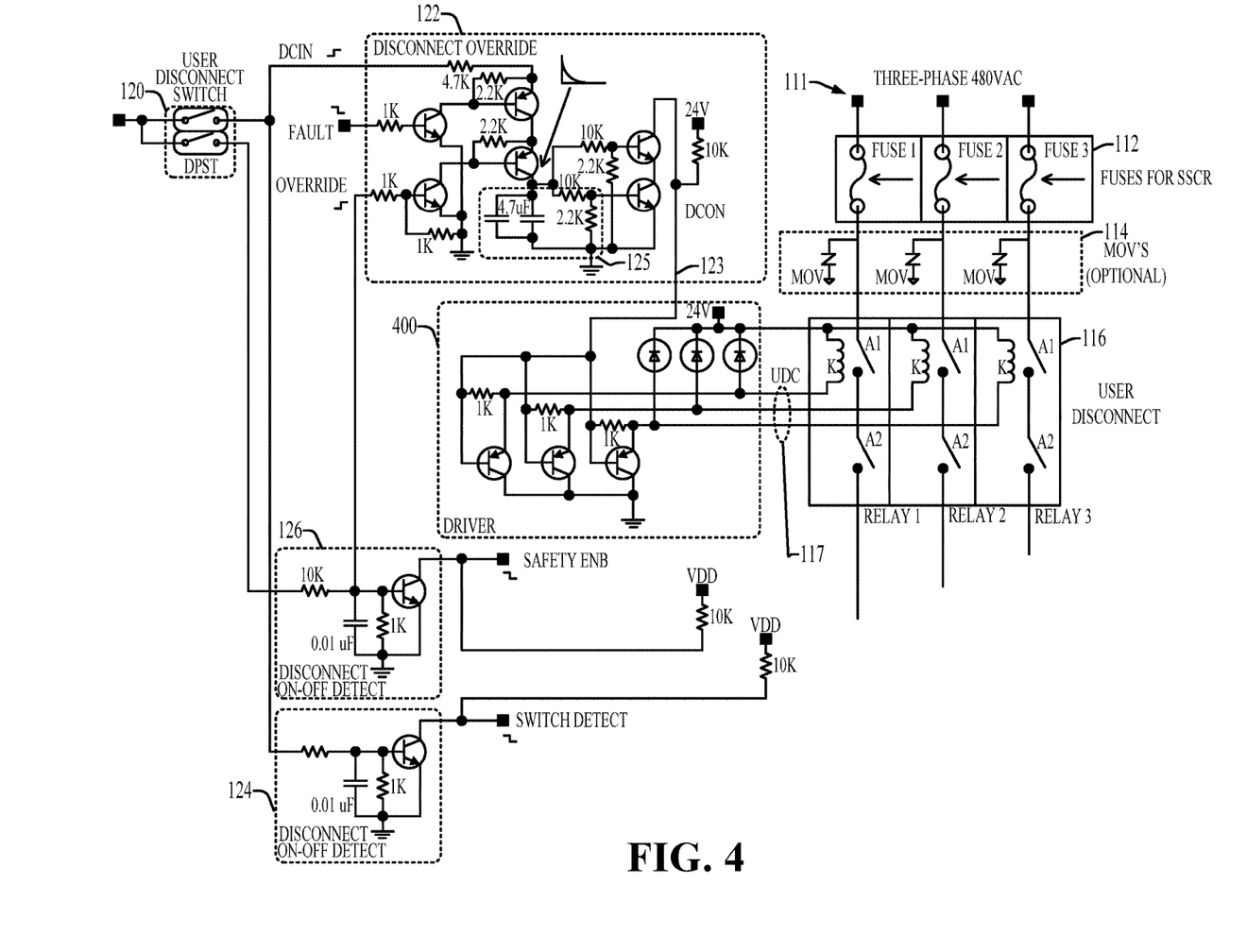
FIG. 4 is a schematic diagram of an example implementation of a disconnect override and on-off detect circuits in the power conversion system of FIG. 1.

The user disconnect circuit 116 may include a driver circuit (e.g., as shown in FIGS. 3 and 5-8 below), for example, to provide relay coil drive signals, triac or SCR drive signals, FET gate control signals, etc.) to actuate the switches or contacts of the user disconnect circuit 116, or a driver circuit can be separately provided (e.g., as shown in FIG. 4 below). The user disconnect circuit 116 operates according to the user disconnect control input signal UDC in a first mode or a second mode. The first mode (closed) closes the switches or contacts to allow power transfer from the AC input 111 to the motor drive or motor starter 101. The second mode opens the switches or contacts to prevent power transfer from the AC input 111 to the motor drive or motor starter 101. Two phase lines of the output side of the user disconnect circuit 116 are coupled through an electromagnetic brake fuse circuit 118 to provide an AC input power feed to the source brake (e.g., single phase 480 VAC).

The system 100 includes a user disconnect switch 120 in the enclosure 109, with a user actuatable control feature that makes the user disconnect switch 120 accessible for operator actuation from the exterior of the enclosure 109. The user disconnect switch 120 includes a first contact (e.g., the top contact in FIG. 1) with a first terminal coupled to a control power supply 121, and a second terminal. The user disconnect switch 120 is a double pole single throw (DPST) device in one example, which includes a second contact having a first terminal coupled to the control power supply 121, and a second terminal. The user disconnect switch 120 in one example is a low voltage (24 VDC) device that uses a DPST configuration for redundancy to protect a failed contact from non-operation. The user disconnect switch 120 has a first state (e.g., closed) that closes the first and second contacts, and a second state (e.g., open) that opens the first and second contacts. The first contact controls the disconnect override circuitry (e.g., hardware) that ultimately controls the drivers to the mechanical relays or other switch topologies of the user disconnect circuit 116. In addition, the second contact feeds on-off detection circuits that feed the processor 102 (e.g., firmware) for controlling operation of the PWM switching and to disable the gate firing of the drive. In this example, failure of the first contact to provide an indication of the user actuation to the disconnect override hardware circuit 122 still allows the second contact to provide an indication to the firmware of the processor 102, and vice-versa.

The system 100 includes disconnect override circuit 122 in the enclosure 109 coupled to the user disconnect switch 120, the user disconnect circuit 116, and the processor 102 of the motor drive or motor starter 101. Closure of the user disconnect switch 120 provides a DC disconnect input signal DCIN (e.g., 24 VDC) to the disconnect override circuit 122. The disconnect override circuit 122 includes three inputs and an output 123. A first input of the disconnect override circuit 122 is coupled to receive a disconnect input signal DCIN from the second terminal of the first contact of the user disconnect switch 120. A second input of the disconnect override circuit 122 is coupled to receive a fault signal FAULT from the motor drive or motor starter 101. A third input of the disconnect override circuit 122 is coupled to receive an override signal OVERRIDE.

The output 123 of the disconnect override circuit 122 is coupled directly or indirectly (e.g., through a driver circuit) to provide a disconnect control output signal DCON to the control input 117 of the user disconnect circuit 116. The disconnect control output signal DCON has one of two states determined according to the disconnect input signal DCIN, the fault signal FAULT and the override signal OVERRIDE. A first state of the disconnect control output signal DCON (e.g., HIGH) causes the user disconnect circuit 116 to operate in the first mode (closed). A second state of the disconnect control output signal DCON (e.g., LOW) causes the user disconnect circuit 116 to operate in the second mode (open). In this manner, the disconnect override circuit 122 provides hardware and firmware control of the user disconnect circuit 116, and provides significant advantages in terms of cost, reliability, safety, and system longevity, particularly compared with conventional external relays with a user operated knife switch to disconnect power from a power converter.

The power conversion system 100 in one example also includes first and second detector circuits 124 and 126, respectively. The first detector circuit 124 has an input coupled to receive the disconnect input signal DCIN from the second terminal of the first contact of the user disconnect switch 120. The first detector circuit 124 has an output coupled to provide a switch detect signal SWITCH DETECT to the motor drive or motor starter 101 according to the disconnect input signal DCIN. The second detector circuit 126 has an input coupled to receive a signal from the second terminal of the second contact, as well as first and second outputs that provide inverse logic signals to one another (e.g., FIG. 4 below). A first output of the second detector circuit 126 is coupled to provide the override signal OVERRIDE to the third input of the disconnect override circuit 122 according to the signal from the second terminal of the second contact. A second output of the second detector circuit 126 is coupled to provide a safety enable signal SAFETY ENB to the motor drive or motor starter 101 according to the signal from the second terminal of the second contact. The SAFETY ENB signal allows the processor 102 to disable control of gate firing for a predetermined timeout that is determined by the time for the drive PWM firing drivers to bring the current to zero (or near zero).

The example system 100 in FIG. 1 also includes a dynamic brake circuit for controlled braking of the motor 106, as well as a dynamic brake overload detection circuit 128 with a thermal switch or other temperature sensor proximate the dynamic brake circuitry to provide an overload fault signal to the processor 102 of the motor drive or motor starter 101. The processor 102 performs various fault detection, component health monitoring, and other diagnostic functions which work in combination with hardware disconnect control features in the system 100 to provide advanced shutdown control performance.

In the illustrated example, the processor 102 is configured by program instructions (e.g., firmware) to deliver the fault signal FAULT to the second input of the disconnect override circuit 122 in a first state (e.g., LOW) in response to a detected operating condition or fault in the motor drive or motor starter 101 or a connected component (e.g., 105, 107, 112, 114, 116, 120) in the enclosure 109, or in a second state (e.g., HIGH) when no firmware detected fault condition is present. The first state of the fault signal FAULT prevents the disconnect control output signal DCON from causing the user disconnect circuit 116 to operate in the first mode (closed). The second state HIGH of the fault signal FAULT allows the disconnect control output signal DCON to cause the user disconnect circuit 116 to operate in the first mode or the second mode open according to the disconnect input signal DCIN and the override signal OVERRIDE. In various implementations, the detected operating condition or fault in the motor drive or motor starter 101 or the connected component in the enclosure 109 includes a dynamic brake temperature fault, a dynamic brake overload fault, a drive fault, a varistor MOV fault, and/or a source brake fault.

In certain examples, the disconnect override circuit 122 includes a delay circuit 125 configured to delay transition of the disconnect control output signal DCON from the first state HIGH to the second state LOW. FIG. 4 below shows one circuit implementation of the delay circuit 125. In this or other examples, the processor 102 is configured to delay transition of the fault signal FAULT from the first state LOW to the second state HIGH for a non-zero predetermined time that is determined by the time for pulse width modulation (PWM) firing drivers of the motor drive or motor starter 101 to bring the current through the user disconnect circuit 116 to or near zero. This enhances product longevity by preventing or mitigating relay contact openings when high currents are flowing in the user disconnect circuit 116.

Figure 2:
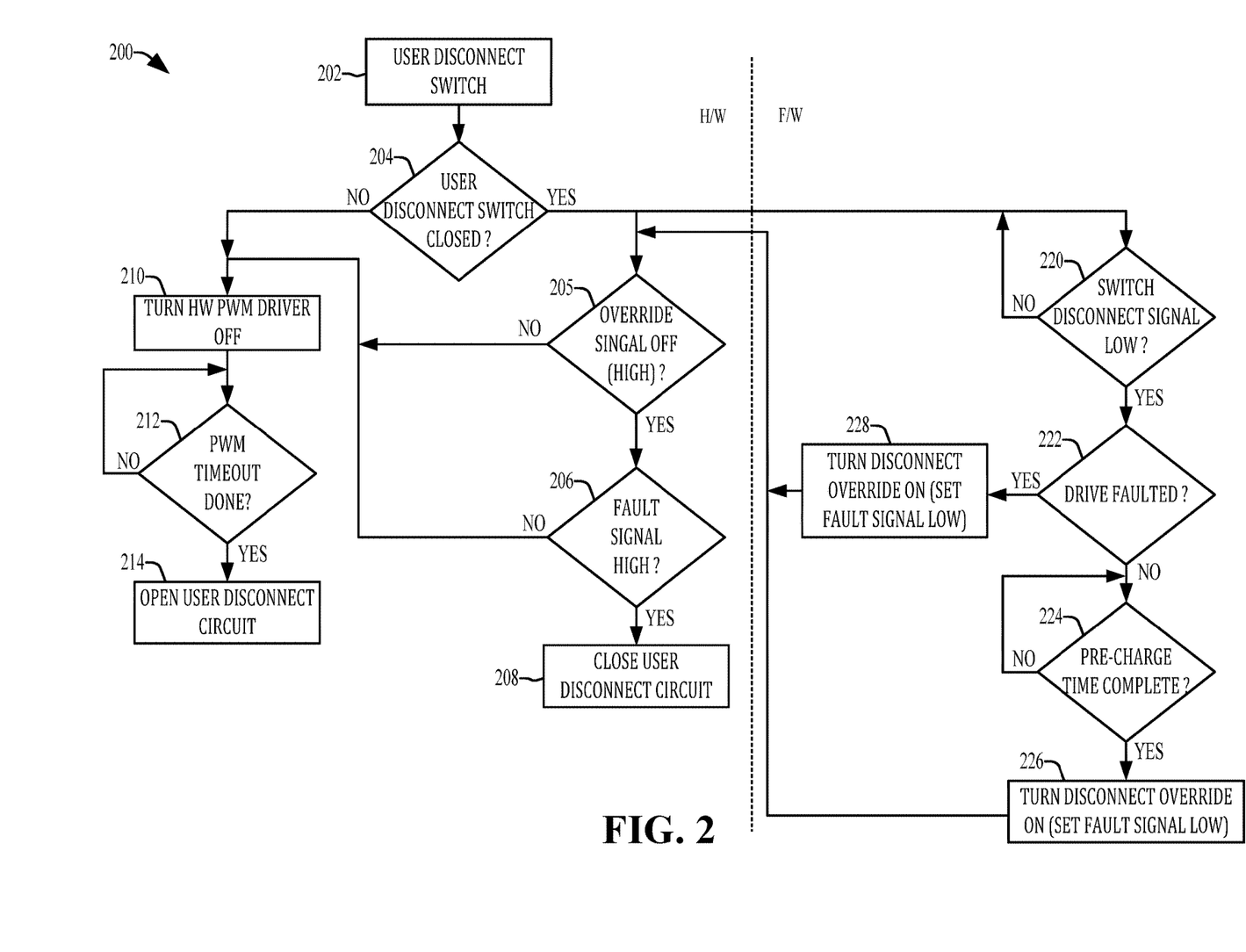
FIG. 2 is a flow diagram of a method.

Referring now to FIGS. 1 and 2, FIG. 2 shows a method 200 which can be implemented by the power conversion system 100 of FIG. 1 for selectively operating the user disconnect circuit 116 in response to a user actuating (e.g., closing) the user disconnect switch 120. The method 200 includes both hardware (H/W) and firmware (F/W) actions as described below, to provide an advanced technique for selective operation of the user disconnect circuit 116 to control whether or not power is applied from the AC input 111 to the motor drive or motor starter 101. The user disconnect switch 12—is closed to allow the drive to operate. A user opening the contacts of the user disconnect switch causes PWM disable through the SAFETY ENB signal. Beginning at 202, the method 200 includes determining whether the user disconnect switch 120 is closed at 204. If not (NO at 204), the method continues proceeds to 210 as described further below.

The system 100 in FIG. 1 includes the disconnect override circuit 122 that directly receives the disconnect input signal DCIN from the first contact of the user disconnect switch 120. In addition, the first disconnect on-off detector circuit 124 receives the disconnect input signal DCIN, and provides the SWITCH DETECT signal to the processor 102 of the motor drive or motor starter 101. The second disconnect on-off detector circuit 126 receives a signal from the second contact of the user disconnect switch 120, and provides the OVERRIDE signal to the disconnect override circuit 122 (e.g., active high when the user disconnect switch 120 is closed), and the second detector circuit 126 provides the SAFETY ENB signal to control the PWM component of the motor drive or motor starter 101 (e.g., active low when the user disconnect switch 120 is closed).

Closure of the user disconnect switch 120 (YES at 204 in FIG. 2) is detected by both the hardware (H/W) and the firmware (F/W). In response to detecting actuation (e.g., closure) of the user disconnect switch 120 at 204, the hardware (e.g., the disconnect override circuit 122) determines at 205 whether the OVERRIDE signal is off (e.g., high) at 205. If not (NO at 205), the method 200 proceeds to 210 as described further below. If the OVERRIDE signal is off (YES at 205), the hardware determines at 206 whether the firmware generated FAULT signal is high. If so (YES at 206), the disconnect override circuit 122 closes the contacts or switches of the user disconnect circuit 116 at 208. If the fault signal is low (NO at 206) or if the OVERRIDE signal is on (low, NO at 205) or if the user disconnect switch 120 is opened (NO at 204), the disconnect override circuit 122 implements a delayed shutdown, for example, using the delay circuit 125. In one example, the PWM component of the motor drive or motor starter 101 receives the SAFETY ENB signal from the second detector circuit 126 and turns the hardware PWM driver circuitry off at 210. In one example, a circuit determines whether a predetermined PWM shutdown timeout is completed at 212. If not (NO at 212), the user disconnect circuit 116 remains closed. Once the PWM timeout is completed (YES at 210), the disconnect override circuit 122 opens contacts or switches of the user disconnect circuit 116 at 214.

FIG. 2 also shows concurrent firmware actions and events in response to closure of the user disconnect switch 120 (YES at 204). At 220, the firmware (e.g., executed by the processor 102) determines whether the switch disconnect signal SWITCH DETECT is low, and if not (NO at 220), continues to monitor the SWITCH DETECT signal. In response to the SWITCH DETECT signal going low (YES at 220), the processor 102 determines whether the drive is faulted at 222. In one example, the processor 102 determines the drive fault status at 222 according to whether or not a predetermined operating condition or fault has been detected in the motor drive or motor starter 101 or a connected component (e.g., 105, 107, 112, 114, 116, 120) in the enclosure 109. In one example, the detected operating condition or fault in the motor drive or motor starter 101 or the connected component in the enclosure 109 includes a dynamic brake temperature fault, a dynamic brake overload fault, a drive fault, a varistor MOV fault, and/or a source brake fault. If a drive fault is detected (YES at 222), the firmware turns the disconnect override on by setting the FAULT signal low at 228. If no drive fault is detected (NO at 222), the firmware determines at 224 whether a predetermined pre-charge time has been completed. In one implementation, the pre-charge time is determined according to the amount of time needed to precharge a DC bus capacitor of the motor drive or motor starter 101. In one example, the motor drive or motor starter 101 re-activates a pre-charge cycle in response to each closure of the user disconnect switch 120 before the disconnect override circuit 122 will be activated. This avoids or mitigates high current inrush to the DC bus capacitor of the motor drive or motor starter 101.

Once the pre-charge time is completed (YES at 224), the processor 102 sets the FAULT signal low at 226. In response to the processor 102 detecting an operating condition or fault (e.g., YES at 222) in the motor drive or motor starter 101 or in a connected component (e.g., 112, 114, 116, 105, 107 and/or 120), the processor 102 generates the fault signal FAULT in the first state LOW to cause the disconnect override circuit 122 to selectively delay the opening 214 of the contact of the user disconnect circuit 116 (e.g., delay at 212 using the delay circuit 125). In this manner, the method 200 provides intelligent hardware and firmware control of the user disconnect circuit 116 in response to a user closing the user disconnect switch 120 to implement electronic motor disconnect features in the system 100 that provides a non-homogeneous solution for redundancy by leveraging hardware and firmware implementations working together.

FIG. 3 shows an example relay implementation of a user disconnect circuit 116 in the power conversion system 100 of FIG. 1. This example includes three controlled mechanical relays with respective relay contacts that are normally open when the system 100 is unpowered. The individual relay contacts have respective relay coils that are coupled to driver transistors. In this example, the driver transistors are npn bipolar transistors, although not a strict requirement of all possible implementations. The base terminals of the driver transistors are coupled to the disconnect override circuit output 123 and operate according to the disconnect control output signal DCON from the disconnect override circuit 122.

The emitters of the driver transistors are coupled together at a ground or reference voltage node, and the collectors are coupled to the lower ends of the respective relay coils to provide respective user disconnect control input signals UDC to the coils according to the disconnect control output signal DCON from the disconnect override circuit 122. The upper relay coil ends are coupled to a positive DC supply voltage (e.g., 24 VDC). In this manner, the control input 117 of the user disconnect circuit 116 coupled to indirectly receive the user disconnect control input signal UDC, and the output 123 of the disconnect override circuit 122 is coupled indirectly through the driver circuit transistors to provide the disconnect control output signal DCON to the control input 117 of the user disconnect circuit 116 in the form of the respective user disconnect control input signals UDC. In certain examples, as previously discussed, the processor 102 is configured to delay transition of the fault signal FAULT from the first state LOW to the second state HIGH for the non-zero predetermined time that is determined by the time for pulse width modulation (PWM) firing drivers of the motor drive or motor starter 101 to bring the current through the relay contacts of the user disconnect circuit 116 to or near zero to provide a solution that mitigates or avoids full or high current contact switching turn on or turn off to enhance product longevity by preventing or mitigating relay contact openings when high currents are flowing in the user disconnect circuit 116.

FIG. 4 shows an example implementation of a disconnect override circuit 122 and example on-off detect circuits 124 and 126 that can be used in the power conversion system 100 of FIG. 1. The example of FIG. 4 includes a transistor circuit with capacitors and resistors that provides the delay circuit 125 discussed above, in addition to further transistor and resistor circuitry providing the operation of the disconnect override circuit 122 based on inputs from the user disconnect switch 120, the first and second disconnect-off detector circuits 124 and 126, as well as based on the FAULT signal controlled by firmware execution by the processor 102 of the motor drive or motor starter 101 in the power conversion system 100. In operation according to one example, the disconnect control output signal DCON at the output 123 of the disconnect override circuit 122 is pulled high by a pull-up resistor (e.g., 10 KΩ), and thus the driver PNP transistors will be off and the relay coils will be deenergized, leaving the relay contacts in the normally open state to prevent power transfer from the AC input 111 to the motor drive or motor starter 101. When the user disconnect switch 120 is closed (ON), the second detector circuit 126 provides the SAFETY ENB signal to the processor 102 in a low state by operation of an npn transistor, while the circuit 126 provides the OVERRIDE signal in a high state. The transistor circuits of the disconnect override circuit 122 operate to selectively assert the disconnect control output signal DCON at the output 123 in an active low state in response to closure of the user disconnect switch 120 in combination with the OVERRIDE signal being in the high state and the FAULT signal from the processor 102 being in a high state. The delay circuit 125 provides a predetermined delay time to transition the disconnect control output signal DCON from its high state to a low state.

The driver circuit 400 and FIG. 4 provides three pnp driver transistors individually associated with respective ones of the relay coils of the user disconnect circuit 116. In response to the disconnect control output signal DCON at the output 123 transitioning to the active low state, the driver circuit transistors turn on, and allow current flow through the respective relay coils. This closes the normally open contacts of the user disconnect circuit 116 and allows power transfer from the AC input 111 to the motor drive or motor starter 101. The series transistors operated according to the respective FAULT and OVERRIDE signal in the disconnect override circuit 122 allow redundancy in event of failure, and the illustrated example also provides redundancy in the delay circuit 125 by the use of two parallel capacitors, in which an open circuit failure of one of the capacitors still allows the circuit to work, whereas a short in one of the parallel capacitors will force the relays open (OFF). In asserted low state of the FAULT signal from the processor 102 means a fault occurred or the processor 102 does not wish the user disconnect circuit relays to be allowed to close or the processor 102 desires the relay contacts to be forced to open. The example disconnect override circuit 122 and the detector circuits 124, 126, and, nation with the firmware execution by the processor 102 of the motor drive or motor starter 101 provide significant advantages compared with simple external user disconnect switch operation of an external relay in terms of better, low cost, low real estate, higher thermal capability. The illustrated examples also provide robust homogenous solution with maximized redundancy by leveraging the direct hardware and firmware control with diagnostics for the electronic motor disconnect implementation.

Figure 5:
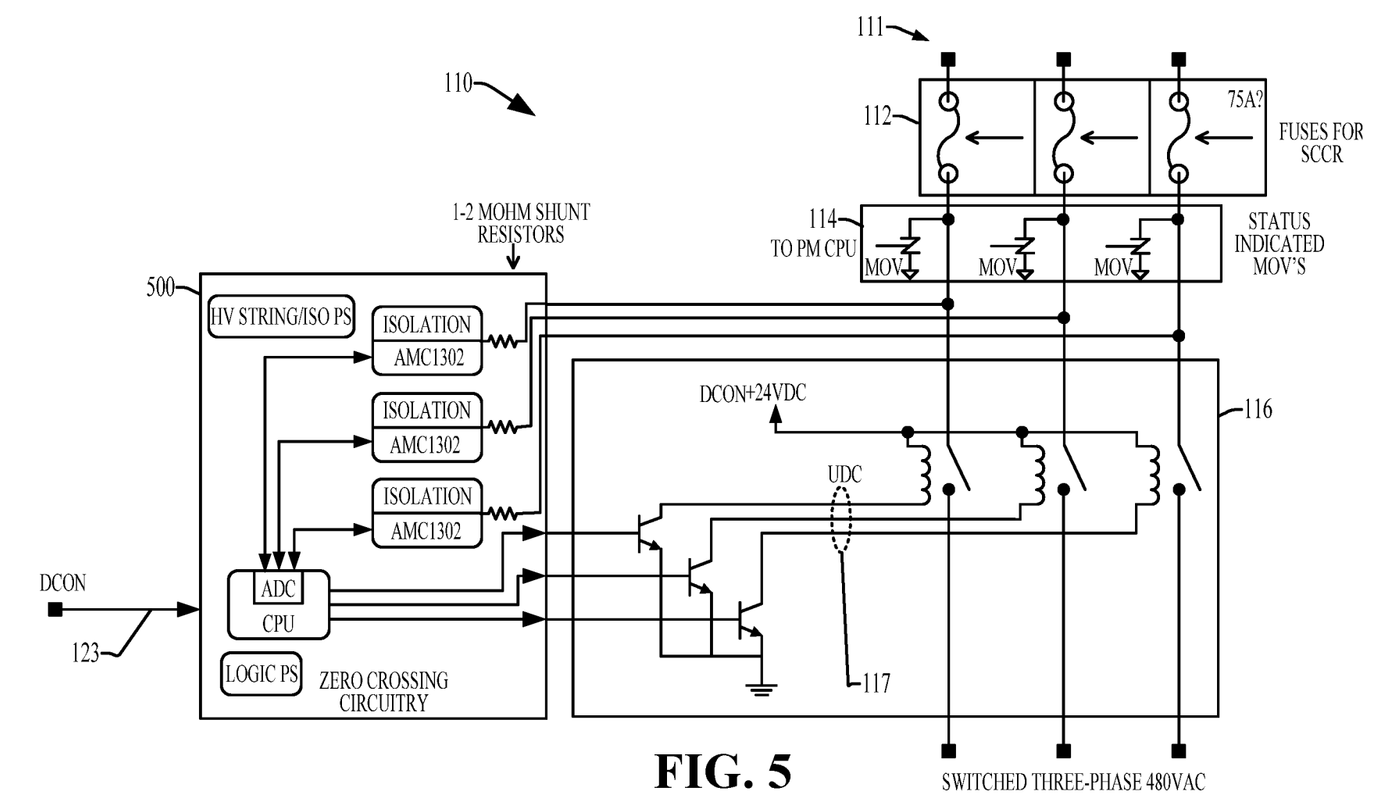
FIG. 5 is a schematic diagram of another example relay implementation of a user disconnect circuit with a zero-crossing circuit in the power conversion system of FIG. 1.

Referring also to FIGS. 5-8, various implementations are possible using solid state devices such as thyristors (back to back SCRs, or TRIACs), solid state transistors (IGBT), or mechanical relays or the like. In the example of FIG. 3, mechanical relay components have advantages in terms of low cost, low real estate, and lower thermal aspects. FIG. 5 shows another example relay implementation of a user disconnect circuit 116 that can be used in the power conversion system of FIG. 1. This example includes three relay contacts and associated relay coils with an included npn transistor drive circuit generally as described above in connection with FIG. 3. The example of FIG. 5 also includes a zero-crossing circuit 500. The circuit 500 provides high voltage isolation with high impedance shunt resistors to sense the voltages of the individual phase lines at the output of the varistor circuit 114. The feedback signals from the shunt resistors are provided through isolation circuits to an analog-to-digital converter (ADC) integrated with, or operatively coupled with a separate processor (e.g., CPU) powered by a logic power supply. The processor of the zero-crossing circuit 500 receives the disconnect control output signal DCON from the output 123 of the disconnect override circuit 122, and selectively provides transistor control signals to the bases of the driver circuit npn transistors. In this example, the processor of the zero crossing circuit 500 provides active high transistor control signals to energize the relay coils and close the respective contacts of the user disconnect circuit 116, or provides low control signals to deenergize the relay coils and open the respective relay contacts according to the disconnect output signal DCON from the disconnect override circuit 122.

Figure 6:
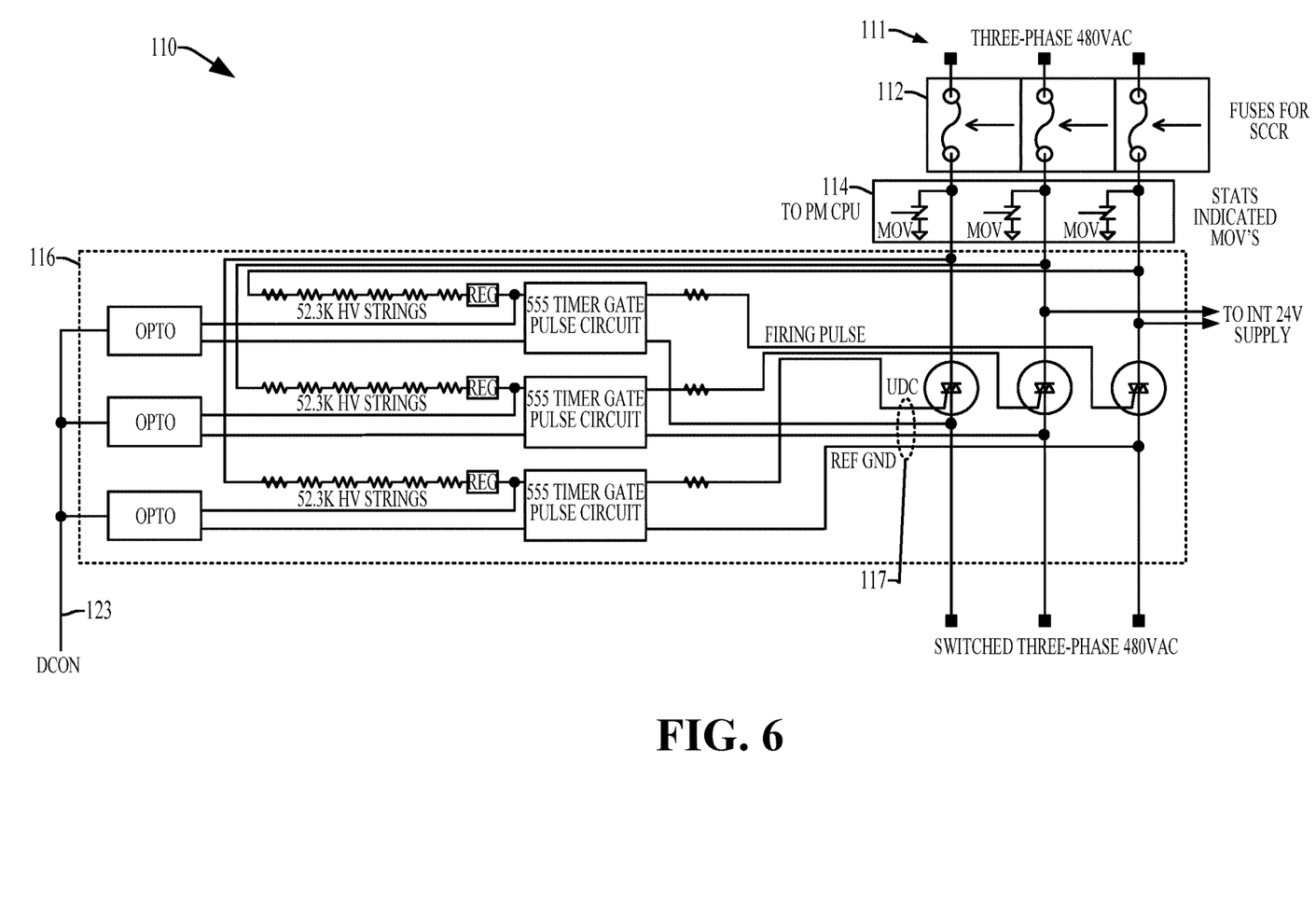
FIG. 6 is a schematic diagram of an example triac implementation of a user disconnect circuit in the power conversion system of FIG. 1.

FIG. 6 shows an example triac implementation of a user disconnect circuit 116 that can be used in the power conversion system of FIG. 1. The user disconnect circuit 116 in this example includes optical isolator circuits or optocouplers with inputs coupled to the output 123 of the disconnect override circuit 122 to receive the disconnect control output signal DCON. This example includes three triacs coupled between the varistor circuit 114 and the motor drive or motor starter 101. The triacs are actuated by voltages on the associated phase inputs of the user disconnect circuit 116 by corresponding high voltage resistor strings that power an associated regulator for each circuit phase. The regulator outputs are connected to respective timer gate pulse circuits coupled through associated resistors to the triac control terminals of the respective triacs. The optically coupled disconnect control output signals selectively disable triac firing operation for each of the three circuit phases in response to the disconnect control output signal DCON.

Figure 7:
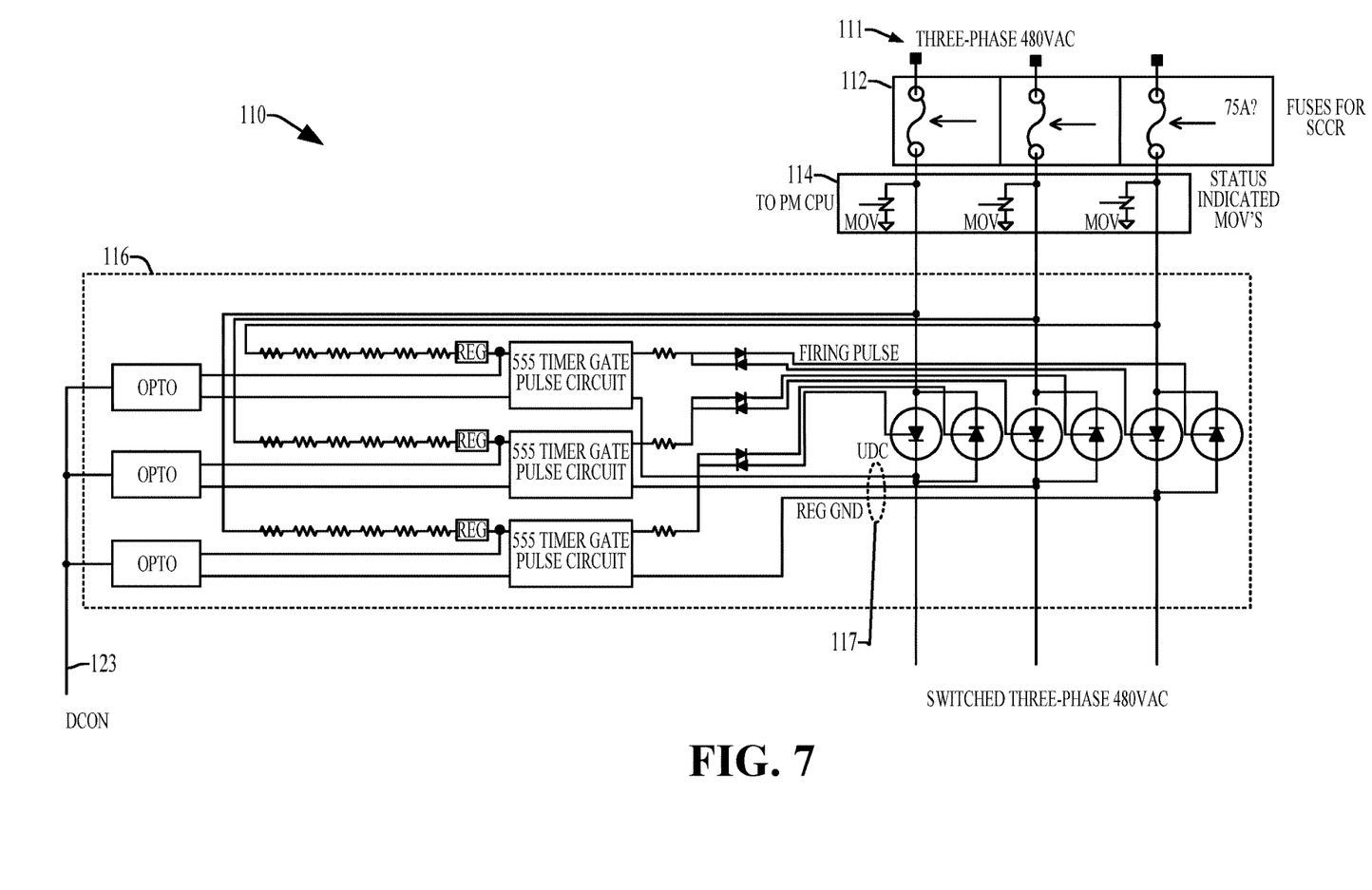
FIG. 7 is a schematic diagram of an example SCR implementation of a user disconnect circuit in the power conversion system of FIG. 1.

FIG. 7 shows an example SCR implementation of a user disconnect circuit 116 that can be used in the power conversion system of FIG. 1. This example includes three sets of reverse connected dual SCRs coupled between the varistor circuit 114 and the motor drive or motor starter 101, along with associated control terminal diodes and output resistors. The user disconnect circuit 116 in FIG. 7 includes optical isolator circuits or optocouplers with inputs coupled to the output 123 of the disconnect override circuit 122 to receive the disconnect control output signal DCON. The SCRs in FIG. 7 are actuated by voltages on the associated phase inputs of the user disconnect circuit 116 by corresponding high voltage resistor strings that power an associated regulator that feeds a gate pulse timer circuit for each circuit phase. The optically coupled disconnect control output signals selectively disable SCR firing operation for each of the three circuit phases in response to the disconnect control output signal DCON.

Figure 8:
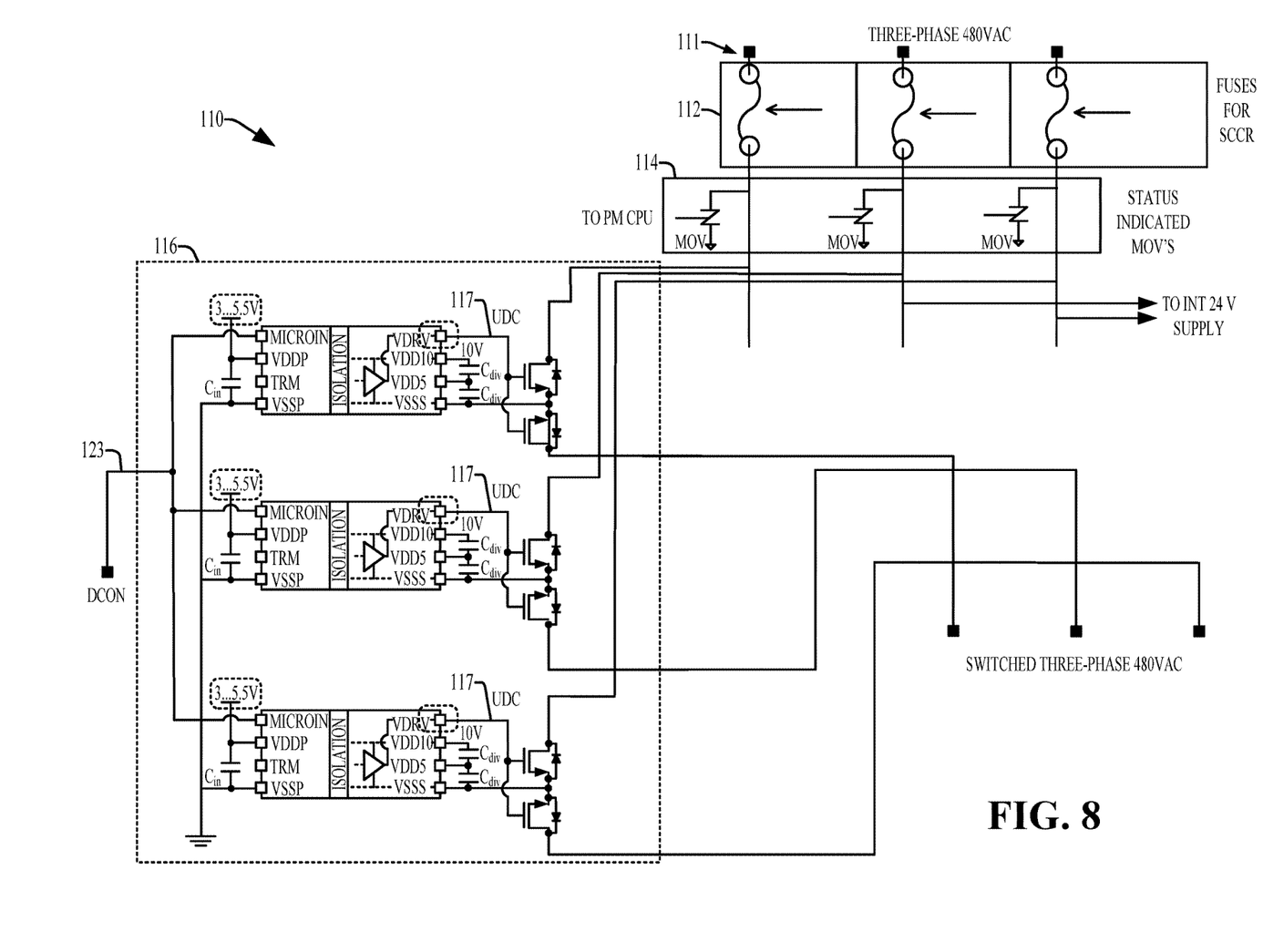
FIG. 8 is a schematic diagram of an example solid state FET implementation of a user disconnect circuit in the power conversion system of FIG. 1.

FIG. 8 shows an example solid state FET implementation (e.g., three-phase solid-state relay) for a user disconnect circuit 116 that can be used in the power conversion system of FIG. 1. In this example, each phase of the user disconnect circuit 116 includes a pair of series connected FETs, including an n-channel device and a p-channel device with gates coupled to one another and to a respective driver circuit that provides an associated disconnect control output signal DCON to the corresponding control input 117 of the user disconnect circuit 116. The driver circuits include input terminals coupled to the output 123 of the disconnect override circuit 122 and operated according to the disconnect control output signal DCON.

Disconnect devices designed for external DIN rail mounting and not designed to be integrated within a product have limited thermal tolerance not suitable for integration. The disclosed examples facilitate integration of user disconnect circuitry and functionality within a motor drive or motor starter enclosure 109. The illustrated examples, moreover, employee electronic motor disconnect devices such as mechanical relays, or solid-state devices as an alternative to the traditional knife switch disconnect technology. Further, the described examples provide intelligent combination of hardware and firmware functionality to provide an integrated operational solution, which includes high reliability and implementation redundancy for a non-homogenous design leveraging firmware and hardware for monitoring and controlling the operation. Specific examples also control the current switching to low levels to provide long life and reliable operation, while allowing a user to safely disconnect and lock out the drive high voltage for safety during operator maintenance and other access to the enclosure interior.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A power conversion system, comprising:
   a motor drive or motor starter in an enclosure;
   an AC input adapted to be coupled to an AC power source;
   a user disconnect circuit coupled between the AC input and the motor drive or motor starter in the enclosure, the user disconnect circuit having a control input configured to receive a user disconnect control input signal, the user disconnect circuit being configured to operate, according to the user disconnect control input signal, in a first mode that allows power transfer from the AC input to the motor drive or motor starter, and a second mode that prevents power transfer from the AC input to the motor drive or motor starter;
   a user disconnect switch in the enclosure, the user disconnect switch accessible for operator actuation from an exterior of the enclosure, the user disconnect switch including: a first contact having a first terminal coupled to a control power supply, and a second terminal; and a second contact having a first terminal coupled to the control power supply, and a second terminal, the user disconnect switch having a first state that closes the first and second contacts, and a second state that opens the first and second contacts;
   a disconnect override circuit in the enclosure, the disconnect override circuit having: a first input coupled to receive a disconnect input signal from the second terminal of the first contact; a second input coupled to receive a fault signal from the motor drive or motor starter; a third input coupled to receive an override signal; and an output coupled to provide a disconnect control output signal to the control input of the user disconnect circuit having one of a first state to cause the user disconnect circuit to operate in the first mode and a second state to cause the user disconnect circuit to operate in the second mode according to the disconnect input signal, the fault signal and the override signal.

2. The power conversion system of claim 1, wherein:
   the motor drive or motor starter includes a processor, and an electronic memory with program instructions executable by the processor to deliver the fault signal to the second input of the disconnect override circuit in a first state in response to a detected operating condition or fault in the motor drive or motor starter or a connected component in the enclosure, or in a second state;

the first state of the fault signal prevents the disconnect control output signal from causing the user disconnect circuit to operate in the first mode; and the second state of the fault signal allowing the disconnect control output signal to cause the user disconnect circuit to operate in the first mode or the second mode according to the disconnect input signal and the override signal.

3. The power conversion system of claim 2, wherein the detected operating condition or fault in the motor drive or motor starter or the connected component in the enclosure includes at least one of: a dynamic brake temperature fault, a dynamic brake overload fault, a drive fault, a varistor fault, and a source brake fault.

4. The power conversion system of claim 2, further comprising a first detector circuit having an input coupled to receive the disconnect input signal from the second terminal of the first contact, and an output coupled to provide a switch detect signal to the motor drive or motor starter according to the disconnect input signal.

5. The power conversion system of claim 4, further comprising a second detector circuit having an input coupled to receive a signal from the second terminal of the second contact, a first output coupled to provide the override signal to the third input of the disconnect override circuit according to the signal from the second terminal of the second contact, and a second output coupled to provide a safety enable signal to the motor drive or motor starter according to the signal from the second terminal of the second contact.

6. The power conversion system of claim 2, wherein the disconnect override circuit includes a delay circuit configured to delay transition of the disconnect control output signal from the first state to the second state.

7. The power conversion system of claim 6, wherein the processor of the motor drive or motor starter is configured to delay transition of the fault signal from the first state to the second state for a non-zero predetermined time determined by the time for the pulse width modulation firing drivers of the motor drive or motor starter to bring a current through the user disconnect circuit to or near zero.

8. The power conversion system of claim 1, further comprising a first detector circuit having an input coupled to receive the disconnect input signal from the second terminal of the first contact, and an output coupled to provide a switch detect signal to the motor drive or motor starter according to the disconnect input signal.

9. The power conversion system of claim 8, further comprising a second detector circuit having an input coupled to receive a signal from the second terminal of the second contact, a first output coupled to provide the override signal to the third input of the disconnect override circuit according to the signal from the second terminal of the second contact, and a second output coupled to provide a safety enable signal to the motor drive or motor starter according to the signal from the second terminal of the second contact.

10. The power conversion system of claim 9, wherein the motor drive or motor starter is configured to delay transition of the fault signal from the first state to the second state for a non-zero predetermined time determined by the time for the pulse width modulation firing drivers of the motor drive or motor starter to bring a current through the user disconnect circuit to or near zero.

11. The power conversion system of claim 1, wherein the disconnect override circuit includes a delay circuit configured to delay transition of the disconnect control output signal from the first state to the second state.

12. The power conversion system of claim 11, wherein the motor drive or motor starter is configured to delay transition of the fault signal from the first state to the second state for a non-zero predetermined time determined by the time for the pulse width modulation firing drivers of the motor drive or motor starter to bring a current through the user disconnect circuit to or near zero.

13. The power conversion system of claim 1, wherein the motor drive or motor starter is configured to delay transition of the fault signal from the first state to the second state for a non-zero predetermined time determined by the time for the pulse width modulation firing drivers of the motor drive or motor starter to bring a current through the user disconnect circuit to or near zero.

14. A disconnect override circuit, comprising:
a first input adapted to be coupled to receive a disconnect input signal from a user disconnect switch;
a second input adapted to be coupled to receive a fault signal from a motor drive or motor starter;
a third input adapted to be coupled to receive an override signal; and
an output configured to provide a disconnect control output signal to control a user disconnect circuit according to the disconnect input signal, the fault signal and the override signal, the output signal having a first state to cause the user disconnect circuit to operate in a first mode that allows power transfer from the AC input to the motor drive or motor starter, and a second state to cause the user disconnect circuit to operate in a second mode that prevents power transfer from the AC input to the motor drive or motor starter.

15. The disconnect override circuit of claim 14, further comprising a delay circuit configured to delay transition of the disconnect control output signal from the first state to the second state.

16. A method, comprising, in response to detecting actuation of a user disconnect switch of a power conversion system:
using a disconnect override circuit, opening a contact of a user disconnect circuit to prevent power transfer from an AC input to a motor drive or motor starter;
using the disconnect override circuit, selectively delaying the opening of the contact of the user disconnect circuit in response to detecting an asserted fault signal generated by processor of the motor drive or motor starter in a first state; and
in response to the processor detecting an operating condition or fault in the motor drive or motor starter or in a connected component, generating the fault signal in the first state to cause the disconnect override circuit to selectively delay the opening of the contact of the user disconnect circuit.

17. The method of claim 16, wherein the detected operating condition or fault in the motor drive or motor starter or the connected component in the enclosure includes at least one of: a dynamic brake temperature fault, a dynamic brake overload fault, a drive fault, a varistor fault, and a source brake fault.

18. The method of claim 16, further comprising:
in response to the processor detecting no operating condition or fault in the motor drive or motor starter or in a connected component, generating the fault signal in a second state after a precharge delay to allow a capacitor of the motor drive or motor starter to precharge before the disconnect override circuit opens the contact of the user disconnect circuit.

\* \* \* \* \*